United States Patent [19]

Blackard

[11] Patent Number: 5,544,022
[45] Date of Patent: Aug. 6, 1996

[54] PORTABLE SET OF BOAT TRAILER LIGHT ASSEMBLIES

[76] Inventor: Vernon M. Blackard, P.O. Box 945, Zachary, La. 70791

[21] Appl. No.: 492,456
[22] Filed: Jun. 20, 1995
[51] Int. Cl.⁶ .................................................. B60Q 1/00
[52] U.S. Cl. .............................. 362/61; 362/81; 362/226; 362/431
[58] Field of Search ............................ 362/61, 81, 226, 362/249, 431

[56] References Cited

U.S. PATENT DOCUMENTS 3,885,146  5/1975  Whitley Jr. ................................. 362/61
3,887,093  6/1975  Howell ....................................... 362/61
4,884,173  11/1989 Cassidy ..................................... 362/431

*Primary Examiner*—Denise L. Gromada
*Assistant Examiner*—Alfred Basichas

[57] ABSTRACT

A portable set of boat trailer lights which can be quickly and easily removed or applied with respect to a boat is disclosed. The invention comprises a pair of posts including a first post and a second post of a similar configuration. Each post has an upper vertical section extending upwardly and positioned above an aperture adjacent to the rear of a boat. Each post also has a lower angled section of a cylindrical cross-section extending downwardly from the lower end of the upper vertical section. The lower angled section forms an angle with the angles of the two posts being equal and opposite and bending toward each other. Each lower section includes an axial slot extending upwardly from the lower end thereof.

1 Claim, 3 Drawing Sheets

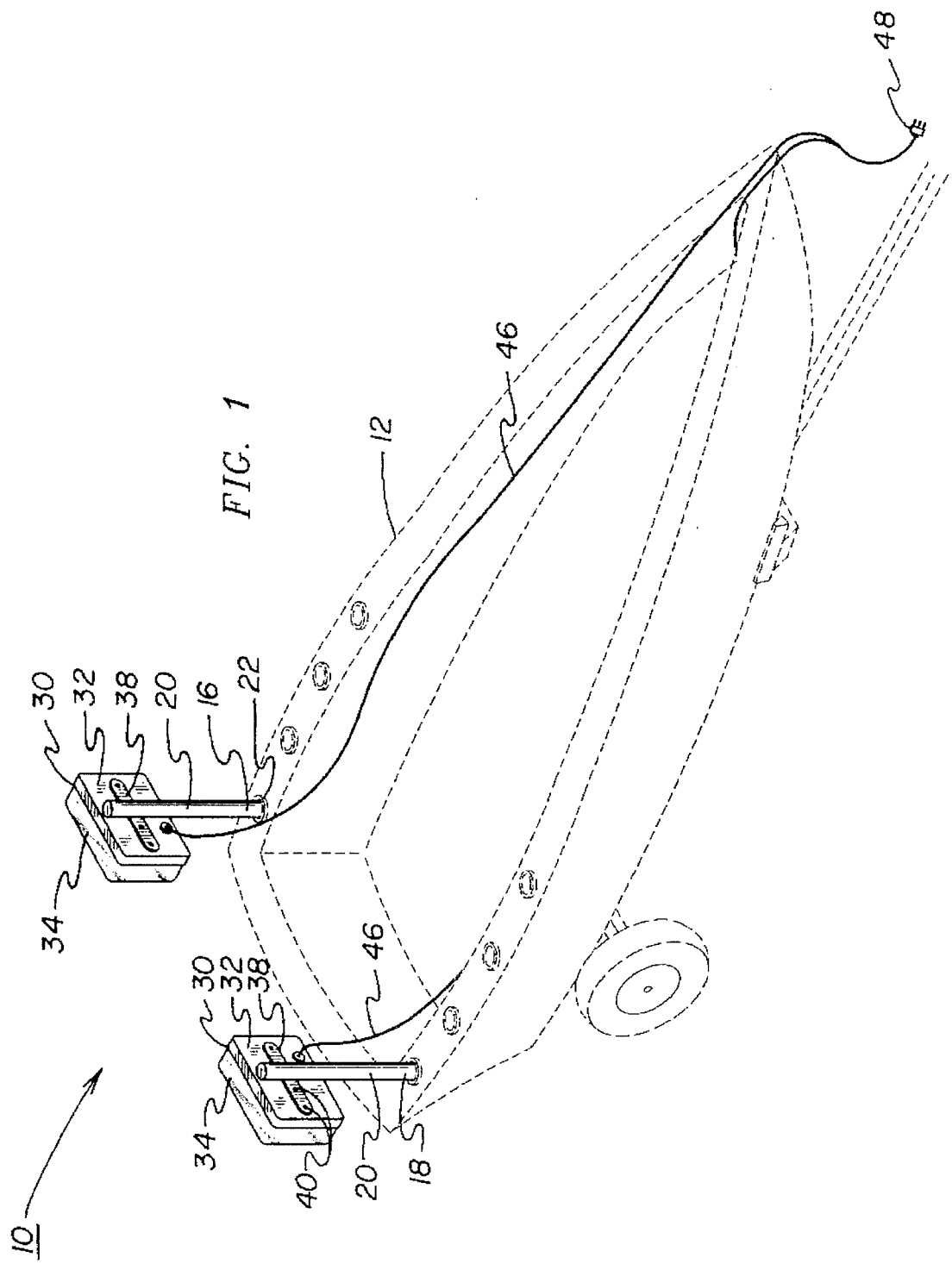

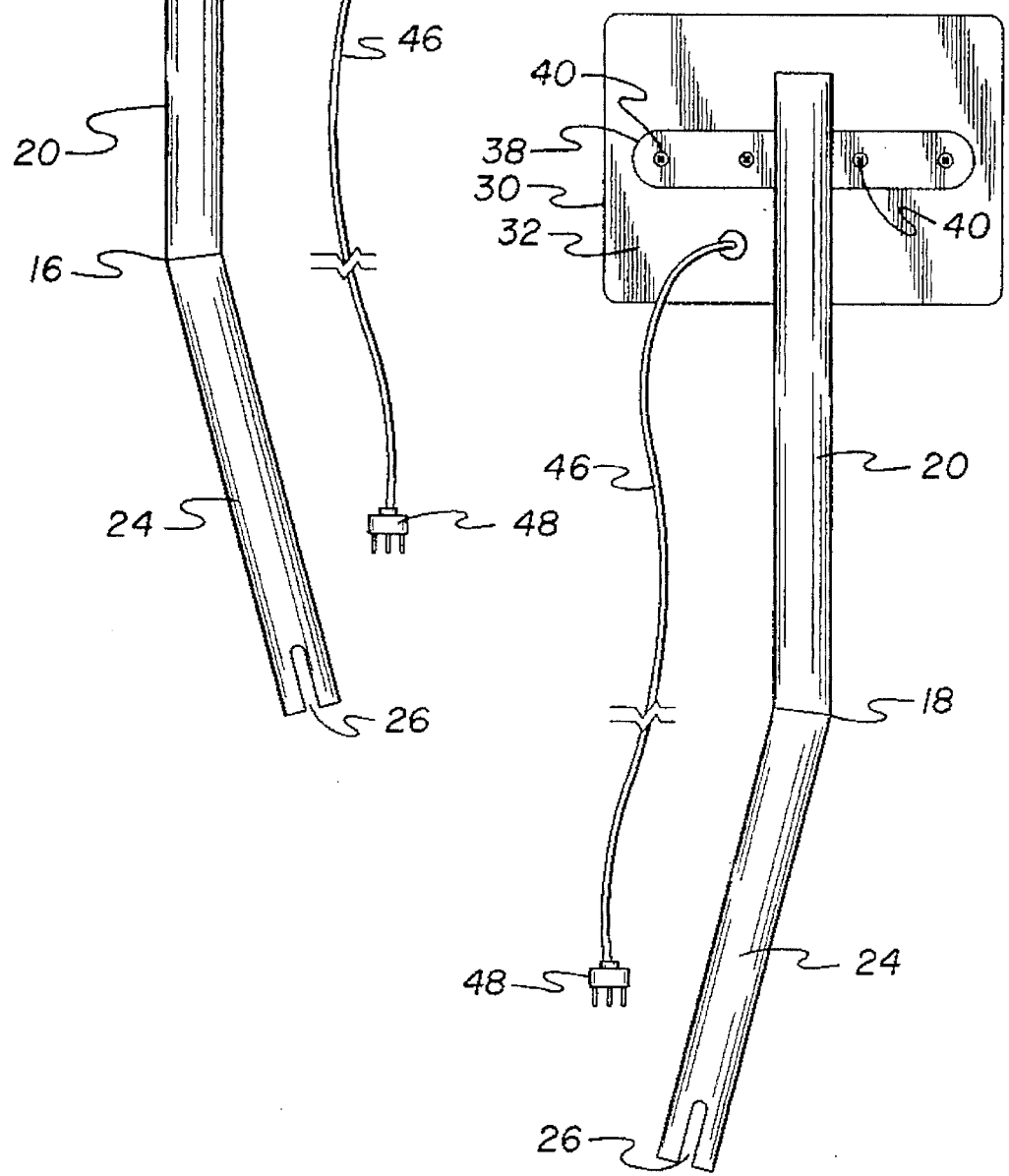

PORTABLE SET OF BOAT TRAILER LIGHT ASSEMBLIES

BACKGROUND OF THE INVENTION

1. Field of the Invention

The present invention relates to a new and improved portable set of boat trailer light assemblies and, more particularly, pertains to quickly and easily removing or applying supplemental lamps with respect to a boat when being towed or when in the water.

2. Description of the Prior Art

The use of lamps and illumination devices with supports of various designs and configurations is known in the prior art. More specifically, lamps and illumination devices with supports of various designs and configurations heretofore devised and utilized for the purpose of illuminating regions as desired through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for quickly and easily removing or applying supplemental lamps with respect to a boat when being towed or when in the water. By way of example, U.S. Pat. No. 3,885,146 to Whitley, Jr. discloses a detachable tail light assembly for boat trailers.

U.S. Pat. No. 4,360,859 to Ziaylek, Jr. discloses a boat light having resiliently flexible and adjustable mount.

U.S. Pat. No. 4,445,163, also to Ziaylek, Jr., discloses a boat light, especially for transom mounting.

U.S. Pat. No. 5,060,121 to Cunningham et al. discloses a sealed tail light for a boat trailer.

Lastly, U.S. Pat. No. 5,157,591 to Chudzik discloses an attachable auxiliary vehicle lighting system.

In this respect, the portable set of boat trailer light assemblies according to the present invention substantially departs from the conventional concepts and designs of the prior art, and in doing so provides an apparatus primarily developed for the purpose of quickly and easily removing or applying supplemental lamps with respect to a boat when being towed or when in the water.

Therefore, it can be appreciated that there exists a continuing need for a new and improved portable set of boat trailer light assemblies which can be used for quickly and easily removing or applying supplemental lamps with respect to a boat when being towed or when in the water. In this regard, the present invention substantially fulfills this need.

SUMMARY OF THE INVENTION

In view of the foregoing disadvantages inherent in the known types of lamps and illumination devices with supports of various designs and configurations now present in the prior art, the present invention provides an improved portable set of boat trailer light assemblies. As such, the general purpose of the present invention, which will be described subsequently in greater detail, is to provide a new and improved portable set of boat trailer light assemblies and methods which have all the advantages of the prior art and none of the disadvantages.

To attain this, the present invention essentially comprises a new and improved portable set of boat trailer light assemblies which can be quickly and easily removed or applied with respect to a boat comprising, in combination, a pair of posts including a first post and a second post of a similar configuration, each post having an upper vertical section extending upwardly and positionable above an aperture adjacent to the rear of a boat, each post having a lower angled section of a cylindrical cross-section extending downwardly from the lower end of the upper vertical section, the lower angled section forming an angle of between about five and ten degrees from the vertical with the angles of the two posts being equal and opposite and bending toward each other, the upper section of each post being between ten and twenty-five percent longer than the lower section, each lower section including an axial slot extending upwardly from the lower end thereof to a distance of about ten percent of the length of the lower section of the posts; an electrical box secured to the upper extent of each post positionable to face rearwardly from the boat, each of the boxes having a generally rectangular rear face coupled to the upper end of the posts, each box having a transparent section in a box-like configuration removably positioned on the outermost surface of the rear portion of the box; a horizontally disposed bracket attached to the upper extent of the post and removably coupled by bolts to the interior surface of the box; and illumination means within each of the boxes with an electrical line extending from each of the electrical boxes and terminating with a common electrical plug coupling the two electrical lines.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved portable set of boat trailer light assemblies which has all the advantages of the prior art lamps and illumination devices with supports of various designs and configurations and none of the disadvantages.

It is another object of the present invention to provide a new and improved portable set of boat trailer light assemblies which may be easily and efficiently manufactured and marketed.

It is a further object of the present invention to provide a new and improved portable set of boat trailer light assemblies which is of a durable and reliable construction.

An even further object of the present invention is to provide a new and improved portable set of boat trailer light assemblies which is susceptible of a low cost of manufacture with regard to both materials and labor, and which accordingly is then susceptible of low prices of sale to the consuming public, thereby making such lamps and illumination devices with supports of various designs and configurations economically available to the buying public.

Still yet another object of the present invention is to provide a new and improved portable set of boat trailer light assemblies which provides in the apparatuses and methods of the prior art some of the advantages thereof, while simultaneously overcoming some of the disadvantages normally associated therewith.

Even still another object of the present invention is to quickly and easily remove or apply supplemental lamps with respect to a boat when being towed or when in the water.

Lastly, it is an object of the present invention to provide a portable set of boat trailer lights which can be quickly and easily removed or applied with respect to a boat. The invention comprises a pair of posts including a first post and a second post of a similar configuration. Each post has an upper vertical section extending upwardly and positioned above an aperture adjacent to the rear of a boat. Each post also has a lower angled section of a cylindrical cross-section extending downwardly from the lower end of the upper vertical section. The lower angled section forms an angle with the angles of the two posts being equal and opposite and bending toward each other. Each lower section includes an axial slot extending upwardly from the lower end thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of the preferred embodiment of the new and improved portable set of boat trailer light assemblies constructed in accordance with the principles of the present invention.

FIG. 2 is a front elevational view of one of the light assemblies shown in FIG. 1.

FIG. 3 is a rear elevational view of the device shown in FIG. 2.

The same reference numerals refer to the same parts throughout the various Figures.

DESCRIPTION OF THE PREFERRED EMBODIMENT

Figure 4:
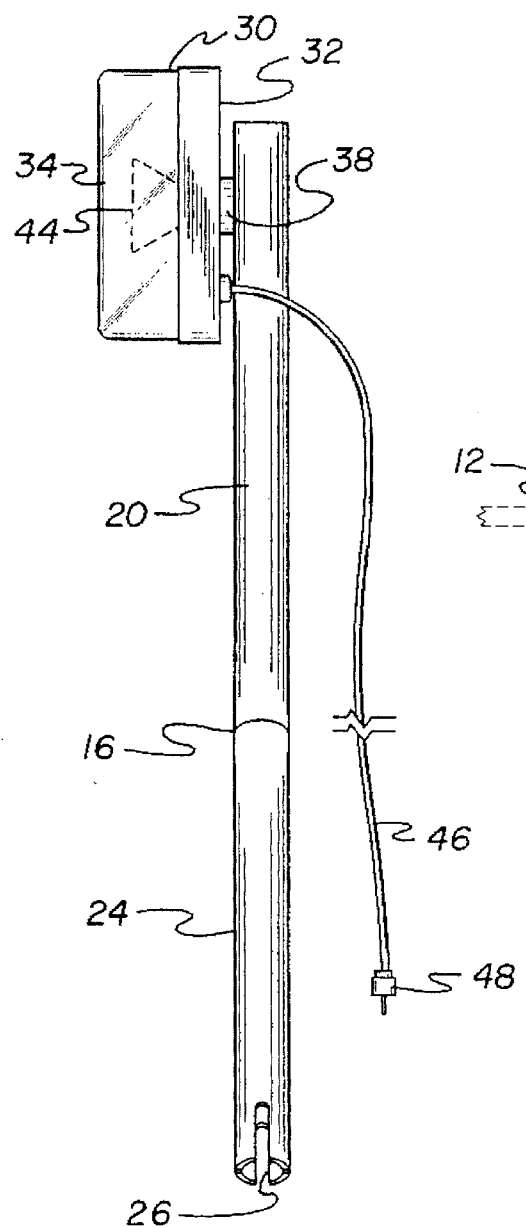
FIG. 4 is a side elevational view of the device shown in FIGS. 2 and 3.
Figure 5:
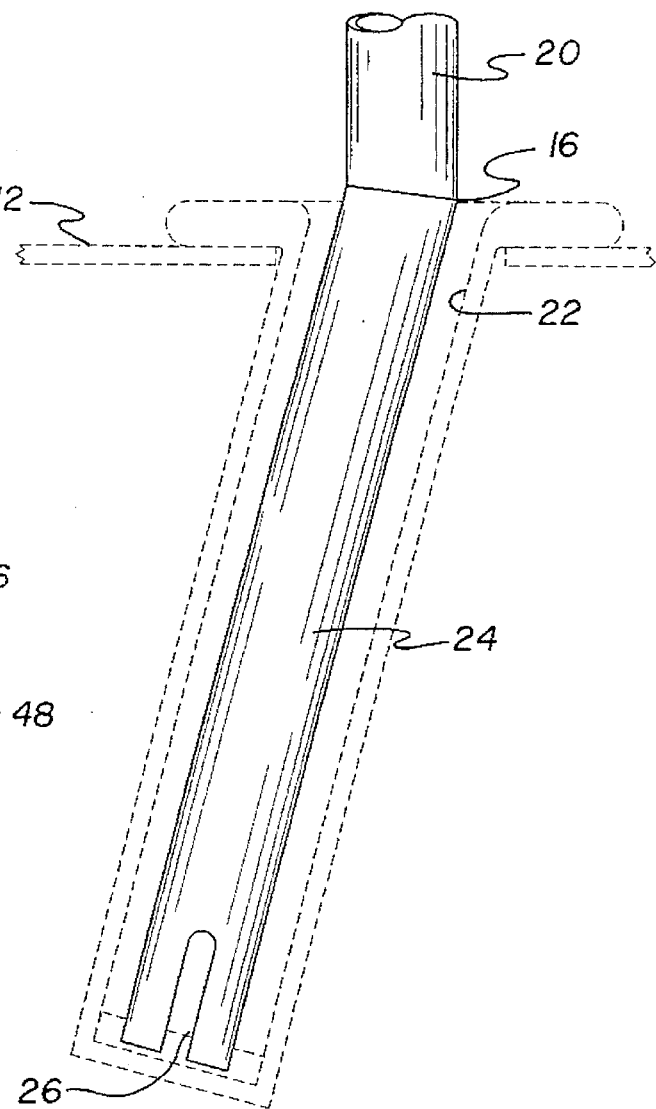
FIG. 5 is a front elevational view of the lower portion of the device shown in the prior Figures.

With reference now to the drawings, and in particular to FIG. 1 thereof, the preferred embodiment of the new and improved portable set of boat trailer light assemblies embodying the principles and concepts of the present invention and generally designated by the reference numeral 10 will be described.

The present invention, the new and improved portable set of boat trailer light assemblies is a system 10 comprised of a plurality of components. In their broadest context, the components include a pair of posts, each with an upper section and a lower section with a bend therebetween, an electric box, a bracket and illumination means. Each of the individual components is specifically configured and correlated one with respect to the other so as to attain the desired objectives.

More specifically, the invention includes a pair of light assemblies 10. Each light assembly has a post to form a pair of posts, including a first post 16 and a second post 18. The posts are of similar configurations. Each post has an upper vertical section 20 extending upwardly and positionable above an aperture 22 adjacent to the rear of the boat. Each post also has a lower angled section 24 of a cylindrical cross-section. Such lower post extends downwardly from the lower ends of the upper vertical section. The lower angled section forms an angle of between about five and ten degrees from the vertical with the angles of the two posts being equal and opposite and being bent toward each other at their lower extents and closest to each other at their lowermost extents. In addition, each lower section is formed with an axial slot 26. Such slot extends upwardly from the lowermost end of the lower section. It extends upwardly at a distance of about ten percent of the length of the lower section of each post.

Next provided is an electrical box 30. A pair of electrical boxes are provided with each secured to the upper extent of an associated post. The electrical box is positioned to face rearwardly from the boat. Each of the boxes has a generally rectangular rear face 32. Such rear face is coupled to the upper end of each post. In addition, each electrical box is formed with a transparent section 34. The transparent section is in a generally box-like configuration with an open forward section removably positioned on the outermost surface of the rear portion of the box.

A bracket 38 is next provided. Such bracket is horizontally disposed. It is attached permanently to the upper extent of each of the posts. It is removably coupled through bolts 40 to the interior surface of the electrical box 30. This allows for the removing of the box from the bracket and associated post.

Lastly provided is an illumination means 44 in the form of a lamp. Such lamp is provided within each of the boxes. Replacement thereof is through the removal of the transparent section 34. In addition, an electrical line 46 extends from each of the electrical boxes. The electrical lines terminate in a common electrical plug 48. The common electrical plug couples the two electrical lines. In this manner, a single plug may be inserted into an electrical outlet or receptacle for the illumination of the lamp within the electrical box.

The present invention comprises a set of boat trailer lights which can be quickly and easily removed when the boat is launched and installed equally as quickly when the boat is once again readied for transit.

The bases of the lights are designed to mate with the built-in rod holders incorporated on most boats and each light is joined by a continuous length of wire. The lights themselves are otherwise conventional and could be offered in the usual variety of colors.

From the foregoing description, the use of these handy and portable lights becomes fairly obvious. One need only insert a light into each of the rod holders upon mounting the boat on the trailer and connect the entire assembly to the tow vehicle. Then, when it is time to once again launch the boat, the lights are quickly and simply removed immediately prior to immersing the trailer.

The entire process is quick and simple, and the lights may be compactly stored when not in use. It is not necessary to employ a string of lights which are permanently attached to the trailer. These types of lights typically have a short lifespan for two distinct reasons. Namely, they are submerged temporarily each time the boat is launched, and they are exposed to the elements at most other times. These repeated wet and dry periods typically result in fraying and cracking of the insulation and premature failure of the entire set.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved portable set of boat trailer light assemblies which can be quickly and easily removed or applied with respect to a boat comprising, in combination:

a pair of posts including a first post and a second post of a similar configuration, each post having an upper vertical section extending upwardly and positionable above an aperture adjacent to the rear of a boat, each post having a lower angled section of a cylindrical cross-section extending downwardly from the lower end of the upper vertical section into opposing apertures of the boat, each aperture having a fishing rod holding chamber, each chamber being angled outwardly between five and ten degrees from vertical, the lower angle section forming an angle of between five and ten degrees from the vertical with the angles of the two posts being equal and opposite and bending toward each other whereby placement of the lower angled section within the fishing rod holding chamber leaves the upper vertical section orthogonally related to the boat, the upper section of each post being between ten and twenty-five percent longer than the lower section, each lower section including an axial slot extending upwardly from the lower end thereof to a distance of about ten percent of the length of the lower section of the posts;

an electrical box secured to the upper extent of each post positionable to face rearwardly from the boat, each of the boxes having a generally rectangular rear face coupled to the upper end of the posts, each box having a transparent section in a box-like configuration removably positioned on the outermost surface of the rear portion of the box;

a horizontally disposed bracket attached to the upper extent of the post and removably coupled by bolts to the interior surface of the box; and illumination means within each of the boxes with an electrical line extending from each of the electrical boxes and terminating with a common electrical plug coupling the two electrical lines.

* * * * *